US012605676B2

(12) United States Patent
Comini et al.

(10) Patent No.: US 12,605,676 B2
(45) Date of Patent: Apr. 21, 2026

(54) FILTRATION HEAD FOR VACUUM FILTRATION, MANIFOLD FOR VACUUM FILTRATION AND METHOD OF MODIFYING AN EXISTING FILTRATION HEAD FOR VACUUM FILTRATION

(71) Applicant: Merck Patent GmbH, Darmstadt (DE)

(72) Inventors: Fabrice Comini, Selestat (FR); Didier Metz, Stotzheim (FR); Philippe Rivat, Dorlisheim (FR)

(73) Assignee: Merck Patent GmbH, Darmstadt (DE)

( * ) Notice: Subject to any disclaimer, the term of this patent is extended or adjusted under 35 U.S.C. 154(b) by 1112 days.

(21) Appl. No.: 17/423,130

(22) PCT Filed: Jan. 14, 2020

(86) PCT No.: PCT/EP2020/050740
§ 371 (c)(1),
(2) Date: Jul. 15, 2021

(87) PCT Pub. No.: WO2020/148245
PCT Pub. Date: Jul. 23, 2020

(65) Prior Publication Data
US 2022/0134285 A1      May 5, 2022

(30) Foreign Application Priority Data
Jan. 16, 2019      (EP) ...................................... 19305048

(51) Int. Cl.
*B01D 63/08*          (2006.01)
*B01L 3/00*           (2006.01)

(52) U.S. Cl.
CPC .......... *B01D 63/087* (2013.01); *B01L 3/5023* (2013.01); *B01D 2313/12* (2013.01);
(Continued)

(58) Field of Classification Search
None
See application file for complete search history.

(56) References Cited

U.S. PATENT DOCUMENTS

| | | | |
|---|---|---|---|
| 5,208,161 | A | 5/1993 | Saunders et al. |
| 5,703,359 | A | 12/1997 | Wampler, III |
| (Continued) | | | |

FOREIGN PATENT DOCUMENTS

| | | |
|---|---|---|
| JP | H0326321 A | 2/1991 |
| JP | 2008005840 A | 1/2008 |

OTHER PUBLICATIONS

Office Action in corresponding CN Application No. 202080009733.5 dated Oct. 16, 2023 (pp. 1-8); english translation thereof (pp. 1-6) and Search report (pp. 1-3).

(Continued)

*Primary Examiner* — Peter Keyworth
(74) *Attorney, Agent, or Firm* — EMD Millipore Corporation

(57)          ABSTRACT

A vacuum filtration head (1) having a receptacle for a support (2) for a membrane filter (3) for microbiological testing of a liquid substance to be drawn from an upstream side of the membrane filter (3) to a downstream side of the membrane filter (3) through the membrane filter (3), or the support (2) for such membrane filter (1), a drain chamber (4) located downstream of the support (2) and communicating with a downstream side of the membrane filter (3) receiving the liquid substance passed through the membrane filter (3), and a drain channel (5) communicating with the drain chamber (4) at an opening (9) and communicating with a vacuum. A protective shield (6) is arranged in the filtration head (1) interfering with a fictive direct line connection while retaining a fluid path (7) to the drain channel (5) past the protective shield (6).

21 Claims, 3 Drawing Sheets

(52) U.S. Cl.
CPC ..... *B01D 2313/21* (2013.01); *B01L 2200/025*
(2013.01); *B01L 2200/141* (2013.01)

(56) References Cited

U.S. PATENT DOCUMENTS

| | | | |
|---|---|---|---|
| 5,873,967 A | | 2/1999 | Clark et al. |
| 9,090,930 B2 | | 7/2015 | Ribault et al. |
| 2012/0292243 A1* | | 11/2012 | Brandt .................. B01D 29/54 |
| | | | 210/232 |
| 2013/0264266 A1 | | 10/2013 | Shick et al. |
| 2014/0272997 A1 | | 9/2014 | Ivie et al. |
| 2016/0216177 A1 | | 7/2016 | Rivat et al. |

OTHER PUBLICATIONS

Office Action in corresponding JP appln.2021-541023 dispatched
Feb. 14, 2024 (pp. 1-2).
Office Action issued Dec. 26, 2022 in the corresponding Indian
application No. 202137036463 (pp. 1-5).
Office Action issued Jun. 28, 2023 in the corresponding Argentina
Patent Application No. 20200100104 (pp. 1-7) and english trans-
lation thereof (pp. 1-3).
International Search Report dated Apr. 2, 2020 issued in corre-
sponding PCT/EP2020/050740 application (3 pages).
Office Action in corresponding CN application No. 202080009733.5
dated dated May 20, 2024 (pp. 1-5) and English translation therof
(pp. 1-3).

* cited by examiner

FILTRATION HEAD FOR VACUUM FILTRATION, MANIFOLD FOR VACUUM FILTRATION AND METHOD OF MODIFYING AN EXISTING FILTRATION HEAD FOR VACUUM FILTRATION

This invention concerns a filtration head for vacuum filtration, a manifold for vacuum filtration and a method of modifying an existing filtration head for vacuum filtration.

This invention is applicable in particular in the fields of food and beverage, biopharmaceutical, cosmetics, hospital, but also for diagnostic, healthcare and research, in particular for bioburden and sterility testing. Current solutions for bioburden and sterility testing in the above fields for filtering filterable liquid samples of fluids like water, soft drinks, wine etc. with a typical sample volume of from 10 ml (millilitres) to 1 l (litre) typically involve placing a membrane and a funnel serving as a reservoir for the sample fluid upstream of the membrane on a filtration head, pouring the sample volume to be tested into the funnel and perform the filtration by reducing the pressure downstream from an outlet drain channel of the filtration head by means of a vacuum pump in order to actively draw the liquid sample through the filtration membrane by the pressure differential on both sides of the membrane.

Subsequently, the filtration membrane is removed from its support on the filtration head and is placed into an agar plate for incubation and further testing. The current bioburden testing with the above filtration method and equipment is based on filters in plastic or paper, on re-usable funnels in stainless steel, plastic or glass or single-use disposable funnels.

The filtration head is typically designed with a support to support the membrane filter either directly or through a holder including the membrane filter and, upstream of the membrane filter, with a receptacle for a reservoir (funnel) for receiving and temporarily holding the sample fluid to be filtered.

The support includes typically an annular surface serving as a filter platform or mechanical support that supports the filter membrane in use. A drain chamber is typically located downstream of the support and communicates with the downstream side of the membrane filter when the filter is in place on the support to receive the liquid substance of the sample that has passed through the membrane filter. The support has a seal to avoid that sample fluid may reach the drain channel without passing the membrane filter material.

The filter membrane captures microorganisms of interest and is accordingly arranged in the fluid flow path between the sample reservoir and the drain chamber.

The drain chamber downstream of the membrane filter typically communicates or continues to a drain channel that in return is intended to communicate, in use, with a downstream equipment including a vacuum pump to create the necessary reduced pressure (vacuum) to force the sample fluid through the membrane filter and further drain and discharge the liquid substance of the sample fluid from the filtration head.

Since this type of testing is typically done in series or batches with a large number of different samples tested one after the other, there is a risk that back- or retro-contamination of a next membrane filter occurs due to an amount of a sample fluid from a previous test remaining in the filtration head, pump or other downstream equipment and being brought in contact with a surface on the downstream side of the membrane filter. Such retro-contamination of the membrane filter is a critical concern for microbiological burden testing as it may lead to false positive results and high cost for re-runs of a particular testing circle, batch or programme.

Experience for different types of filtration heads has shown that the main cause of retro-contamination are micro-droplets of proceeding sample fluid that are sprayed onto the back (downstream) surface of the membrane filter. Such micro-droplets are generated due to different scenarios explained in detail below, one being the fast suction of residual sample liquid from the filtration head.

Current attempts to counter the retro-contamination include providing an additional enlarged space for liquid downstream of the membrane filter to allow the residual liquid to be properly accommodated in a distance from the membrane. Since the liquid volume remaining after a previous sample run remains about the same depending from the system setup, the distance between the top level of the liquid and the back surface of the membrane filter may be increased. Further, air in the filter head is less compressed when a next membrane filter is placed on the filtration head, thereby reducing the risk and likelihood that micro-droplets of the sample fluid are generated and may reach and hit the back surface of the membrane. Increasing the volume of the drain chamber downstream of the membrane filter in the filtration head only partly solves the problem but increases the size of the filtration head.

A further measure to avoid the retro-contamination is, after the membrane filter and possibly the membrane support have been removed from the filtration head, to operate the vacuum pump for a short period of time until the residual liquid remaining in the filtration head is removed to the drain. Thus, the filtration head internal volume is dried and the complete remaining liquid is removed. After switching off the vacuum pump any remaining liquid sample may be flushed to avoid retro-contamination of the next filtration membrane testing. This option is unfortunately quite time consuming, prone to errors and involves a lot of manual labour.

A further measure similar to the increase of the size of the volume of the drain chamber is to increase the vertical length of the filtration head and in particular that of the drain channel section of the filtration head in order to further move away the liquid level of residual liquid sample from the filtration membrane.

A still further measure to avoid the retro-contamination is the installation of a three-way valve in the filtration head downstream of the drain chamber so as to be able to selectively block the connection of the drain channel with downstream equipment and aspirate air into the drain chamber between test runs. While this option is quite time consuming, prone to errors and involves a lot of manual labour, too, a further particular problem with this type of solution is that the flush quality is dependent from the valve rotation speed and, when the valve is at the air entrance position, liquid droplets can fall onto the bench and may generate additional labour time for cleaning.

The following is a more detailed explanation of the mechanics leading to the back- or retro-contamination of the filtration membrane in the filtration head.

The back- or retro-contamination is defined as micro-organisms that grow on the side of the membrane that is in reverse direction of the sample flow, i.e. the bottom or downstream side and surface of the filtration membrane. The source of this contamination may come from a not-cleaned instrument or from a previous contaminated sample.

Residual water or liquid may play an important role in the contamination as it can act as a vector of transportation by droplets for the micro-organisms in the filtration head.

During filtration, the liquid sample is sucked from the reservoir (funnel) through the filtration membrane by means of the pressure differential created by the reduced pressure (vacuum) generated downstream of the drain channel until the reservoir is completely empty. When the reservoir is empty, the filtration membrane is not any more permeable to air due to its small pore size. Therefore, some liquid that may still exist in the flow path of the filtration head downstream of the filtration membrane cannot be removed as long as the filtration membrane is in place. For the next test run the previous filtration membrane is removed but the residual liquid trapped in the downstream flow path remains in the filtration head (unless flushed or dried as described above). This liquid may, however, potentially contain micro-organisms.

When the next filtration membrane and reservoir (funnel) are attached to the filtration head, trapped air in the filtration head between the residual liquid level and the membrane filter may generate a sudden pressure increase because the speed of attachment does not allow air to follow through the membrane. The compression may generate micro-droplets from the trapped liquid that are sprayed or splashed in different directions depending whether or not and where the residual liquid can escape. If these micro-droplets reach the membrane, they may retro-contaminate the new filtration membrane and lead to the false positive result.

Another possible cause of retro-contamination is a fast removing of a unit cover of a filtration unit including the membrane placed on the filtration head which may create a depression inside the filtration unit that may leading to a sucking-up of the residual sample fluid in the filtration head to the back surface of the membrane.

Finally, a further cause of retro-contamination is the generation of droplets at startup of filtration by a high initial suction rate due to a quick opening of a tap or a fast startup of a vacuum pump because a quick sucking-up of the residual liquid may cause a vortex at its centre, which, when the vortex collapses, may splash micro-droplets to the back surface of the membrane.

It is the object of the present invention to provide a filtration head for vacuum filtration, a manifold for vacuum filtration, and a method of modifying an existing filtration head for vacuum filtration that help reducing the risk of retro-contamination in micro-biological testing of the membrane filter by micro-droplets generated in the filtration head stemming from residual liquid and air from previous samples.

To solve the problem the present invention provides a filtration head for vacuum filtration as defined by claim 1, a manifold for vacuum filtration as defined by claim 6, and a method of modifying an existing filtration head for vacuum filtration as defined by claim 7. Preferred embodiments and modifications are defined in the respective dependent claims.

In particular, the present invention provides a filtration head for vacuum filtration, comprising a receptacle for a support for a membrane filter for microbiological testing of a liquid substance to be drawn from an upstream side of the membrane filter to a downstream side of the membrane filter through the membrane filter, or the support for such membrane filter, a drain chamber located downstream of the support and communicating with a downstream side of the membrane filter when the membrane filter is in place on the support to receive the liquid substance that has passed through the membrane filter, a drain channel communicating with the drain chamber at an opening and intended to communicate, in use, with downstream equipment including a vacuum pump to drain the liquid substance, a (protective) shield arranged in the filtration head so as to block/interfere with a fictive direct line connection between the opening of the drain channel into the drain chamber and the membrane filter, while retaining a fluid path to the drain channel past the (protective) shield.

Preferably, the (protective) shield is permanently fixed in place in the filtration head or is an insert removable from the filtration head.

Preferably, the (protective) shield is arranged in an inner space of the drain chamber or of the drain channel, or is an insert removable from the drain chamber or the drain channel.

Preferably, the (protective) shield is a body occupying a part of the inner space of the drain chamber to reduce a void volume thereof while retaining the fluid path to the drain channel, the fluid path formed preferably between an inner circumference/periphery of the drain chamber and an outer circumference/periphery of the body.

Preferably, the (protective) shield is a solid or hollow body with one or more spacers provided at its outer periphery so as to retain the body in place in the inner space of the drain chamber or of the drain channel while retaining the fluid path to the drain channel.

The invention also provides a manifold for vacuum filtration, the manifold comprising a plurality of filtration heads according to the invention arranged on a common collection channel communicating with the respective drain channels of the filtration heads.

The invention also provides a method of modifying an existing filtration head for vacuum filtration, the filtration head comprising a receptacle for support for a membrane filter for microbiological testing of a liquid substance to be drawn from an upstream side of the membrane filter to a downstream side of the membrane filter through the membrane filter, or the support for such membrane filter, a drain chamber located downstream of the support and communicating with a downstream side of the membrane filter when the membrane filter is in place on the support to receive the liquid substance that has passed through the membrane filter, a drain channel communicating with the drain chamber at an opening and intended to communicate, in use, with downstream equipment including a vacuum pump to drain the liquid substance, the method comprising arranging a (protective) shield in the existing filtration head so as to block/interfere with a fictive direct line connection between the opening of the drain channel into the drain chamber and the membrane filter while retaining a fluid path to the drain channel past the protective shield.

Preferably, the (protective) shield is permanently fixed in place in the filtration head or is removably inserted into the filtration head as an insert.

Preferably, the (protective) shield is arranged in an inner space of the drain chamber or of the drain channel, or is removably inserted into the drain chamber or the drain channel as an insert.

Preferably, the (protective) shield is a body occupying a part of the inner space of the drain chamber to reduce a void volume thereof while retaining the fluid path to the drain channel, preferably between an inner circumference/periphery of the drain chamber and an outer circumference/periphery of the body.

Preferably, the protective shield is a solid or hollow body with one or more spacers provided, preferably at its outer periphery, so as to retain the body in place in the inner space of the drain chamber or of the drain channel while retaining the fluid path to the drain channel.

The present invention will now be described in the form of various embodiments by reference to the attached drawing, in which.

Figure 5A:
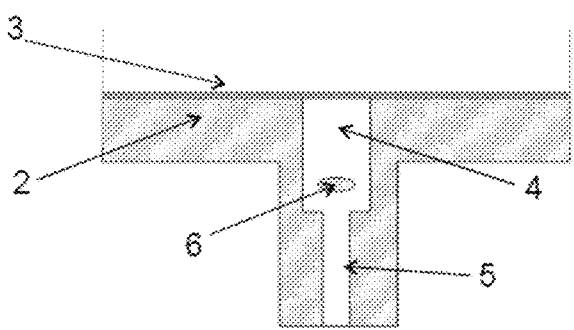
Figure 5B:
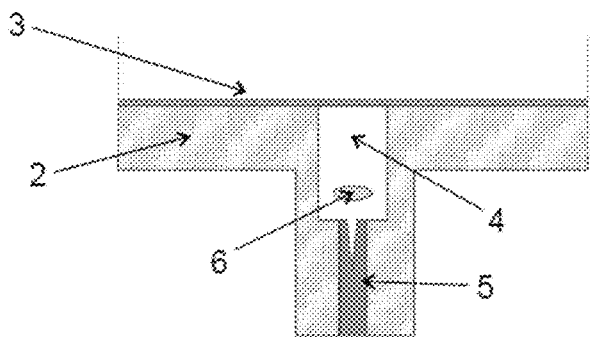
Figure 5C:
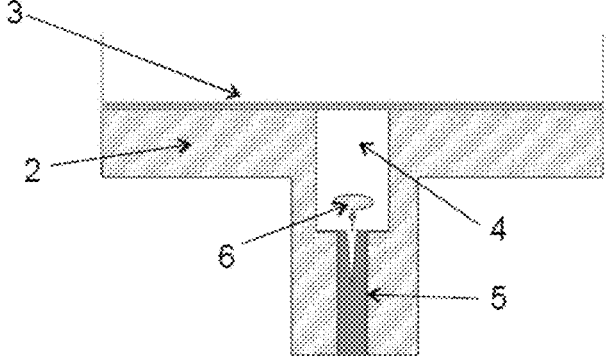

FIG. 5*a-c* are explanatory diagrams explaining the function of the protective shield of the present invention in a filtration head for preventing the retro-contamination of the filtration membrane.

A filtration head for vacuum filtration according to the present invention is widely similar to many filtration heads known in the art as far as the basic functions and related structures for supporting, preferably removably, a membrane filter, a funnel defining a reservoir for holding a desired volume of a sample fluid to be filtered upstream of the membrane filter, and guiding the sample fluid through a fluid path from the funnel through the membrane filter to a downstream drainage port via a drain chamber and a drain channel upon application of a reduced pressure (vacuum) to the downstream side of the flow path are concerned.

Figure 1:
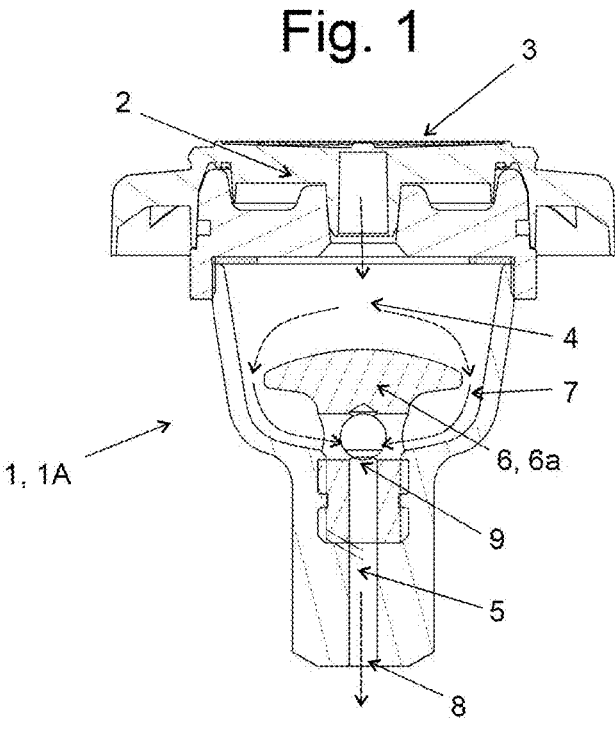
FIG. 1 shows a first embodiment of a filtration head of the present invention.

The filtration head 1/1A in the form of an exemplary first embodiment shown in FIG. 1 comprises a support 2 for the membrane 3 for microbiological testing of a liquid substance to be drawn from a reservoir (not shown) on an upstream side of the membrane filter 3 to a downstream side of the membrane filter 3 through the membrane filter and further to a drainage outlet 8 of the filtration head 1. The support 2 for the membrane filter may be integrated in the filtration head or may be a removable element, i.e. for cleaning, sterilisation and for accommodating filter membranes of different type. The reservoir may be in the form of a funnel, either single-use (disposable) or multi-use that can be selectively attached to the filter head as in the prior art. The support may also be integrated with the reservoir (funnel) and even the membrane and attachable/removable as a unit to/from the filtration head. As the specific structure of the filter support and/or the reservoir is not particularly linked to the concept of the present invention it is not further described here and should not be limiting on the invention.

The filtration head further comprises a drain chamber 4 located downstream of the support 2 and communicating with a downstream side and surface of the membrane filter 3 when the membrane filter is in place on the support 2 in order to receive the liquid substance that has passed through the membrane filter 3 during a test run.

The drain chamber 4 continues to the drain channel 5 which typically communicates with the drain chamber 4 at an opening 9. The drain channel 5 is intended to communicate, in use, with a downstream equipment including, for example, a vacuum pump to drain the liquid substances from the drainage outlet 8 towards downstream equipment.

Figure 2:
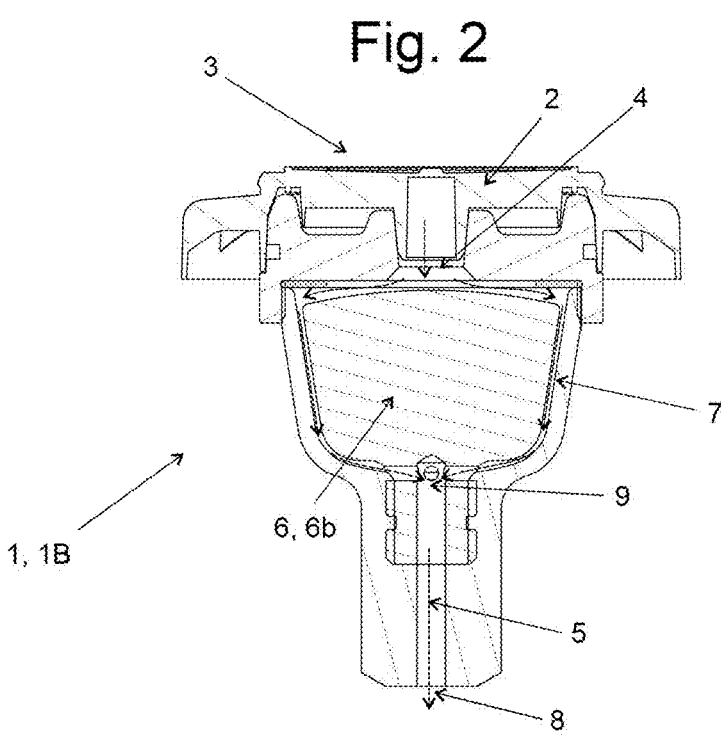
FIG. 2 shows a further embodiment of a filtration head of the present invention.

According to the invention a protective shield 6 is arranged in the filtration head 1 so as to block/interfere with a fictive direct or straight line connection between the opening 9 of the drain channel 5 into drain chamber 4 and the membrane filter 3 while retaining a fluid path 7 to the drain channel 5 past, preferably around the protective shield 6 (see arrows in FIGS. 1 and 2 identifying the flow of the liquid substance downstream from the membrane filter to the drainage outlet). In other words, the shield 6 is arranged to cross a fictive straight cylinder that is formed if the cross section of the opening 9 is linearly shifted to an exposed portion of the membrane filter 3, thereby shielding or blocking or preventing creation of micro-droplets traveling on a direct path to the membrane's back or downstream surface.

In the embodiment of FIG. 1 the protective shield 6 is in the form of a body 6*a* arranged in an inner space of the drain chamber 4. The protective shield 6 in the form of the body 6*a* not only blocks the direct path for micro-droplets but also occupies a part of the inner space of the drain chamber 4 to reduce a void volume of the inner space while retaining the fluid path 7 past/around the body 6*a* to the drain channel 5, in this case between an inner circumference/periphery of the drain chamber 4 and an outer circumference/periphery of the body 6*a*. The representation in FIG. 1 is a cross-sectional view through the centre of the filtration head A and the filtration head 1A is in fact approximately rotational symmetric with respect to the cross section shown in FIG. 1.

In this embodiment (and likewise in all the other embodiments described further below) the protective shield 6 is preferably an insert body that is removable from the filtration head, in this case from the inner space of the drain chamber 4. It may alternatively be permanently fixed in place in the filtration head. However, the removability facilitates the tasks of cleaning and sterilisation after use.

The protective shield may be a solid or a hollow body with one or more spacers provided on its outer periphery so as to retain the body in place in the inner space of the drain chamber. The spacers are not shown in the representation of FIG. 1.

The second embodiment of the filtration head 1/1B shown in FIG. 2 is similar to the first embodiment with the difference that the protective shield 6 is in the form of a larger body 6*b* conforming widely to the shape of the inner space of the drain chamber 4 and thus occupying substantially most of the inner space of the drain chamber 4 in order to substantially reduce the void volume thereof while, again, retaining the fluid path 7 from the downstream side of the membrane filter 3 to the drain channel 5 past the body 6*b*.

The fluid path 7 may be formed, as in the first embodiment, between the inner circumference/periphery of the drain chamber 4 and the outer circumference/periphery of the body 6*b*. The protective shield 6 (body 6*b*) may also snuggly fit into the inner space of the drain chamber and the fluid path 7 may be formed in the form of plural recesses distributed about the outer circumference/periphery of the body 6*b* and/or the inner wall of the drain chamber 4 in the form of grooves. The body 6*b* of the protective shield 6 may be solid or hollow. It may also be removable from the inner space of the drain chamber 4, in this case after the support 2 closing the top end of the drain chamber 4 is removed.

Figure 3:
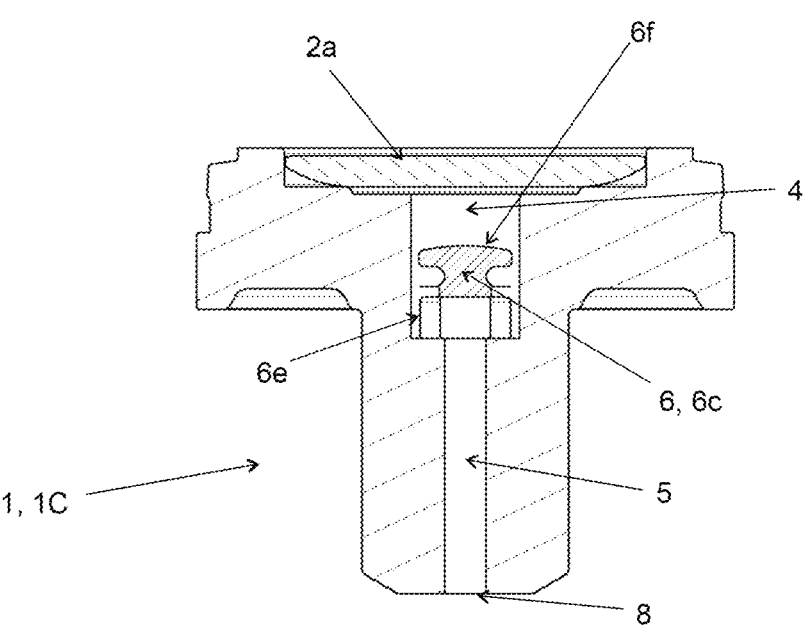
FIG. 3 shows a still further embodiment of a filtration head of the present invention.

The further embodiment of the filtration head 1/1C shown in FIG. 3 differs from the first and second embodiments shown in FIGS. 1 and 2 in that the drain chamber 4 has a smaller volume and a body 6*c* of the protective shield 6 is placed in the drain chamber 4 with plural spacers 6*e* distributed about its lower periphery and resting on a step 4*a* adjacent to the opening 9 of the drain channel into the drain chamber 4. The fluid path 7 to the drain channel 5 is formed between the expanded head portion 6*f* of the body 6*c* and the inner wall of the drain chamber 4 and further through gaps between adjacent spacers 6*e*.

In this embodiment the support 2 for the filter membrane is in the form of a porous plate 2*a* that is removable from its receptacle in the top part of the filtration head 1C.

Figure 4:
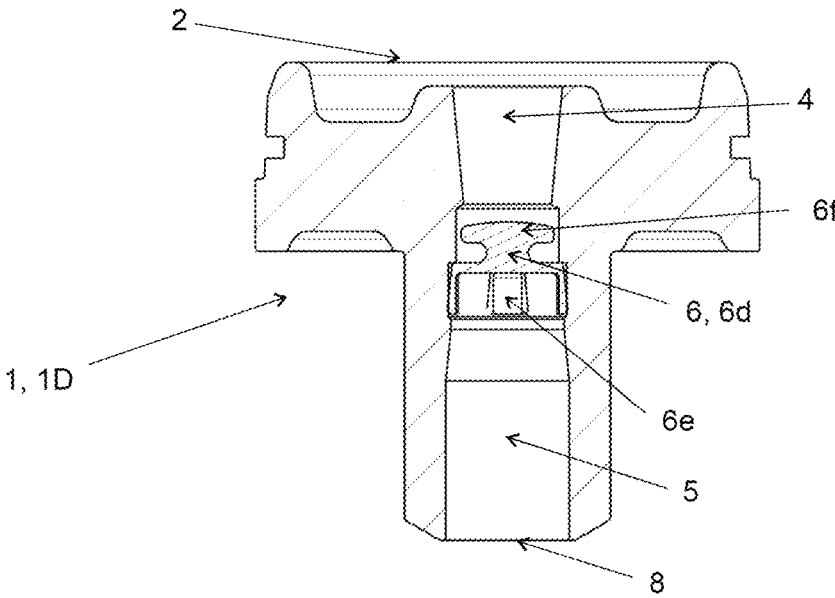
FIG. 4 shows a still further embodiment of a filtration head of the present invention.

Finally, the embodiment of the filtration head 1/1D shown in FIG. 4 differs from the previous embodiment in that the protective shield 6, in particular its body 6d, is inserted into a section of the drain channel 5. Although not shown in the drawing the fluid path 7 past/around the body 6d of the protective shield 6 to the drain channel 5 (the lower portion of the drain channel) is maintained through gaps or recesses in the body 6d. In this embodiment the support 2 is shown integral with the filtration head 1D but it can be of course removable.

The function of the protective shield in all the embodiments is essentially the same in that it prevents residual sample fluid existing in the filtration head downstream of the membrane from a previous testing run to be moved backwards or upstream and creating the potential risk of a contamination of the lower surface side of the membrane filter. The FIGS. 5a-c explain very schematically the function of preventing the back- or retro-contamination by means of the protective shield 6 of the invention. According to FIG. 5a the protective shield 6 is placed or inserted between the filtration membrane 3 and the channel 5 leading to the downstream equipment including the vacuum pump. At the startup of a (next) testing run with a fresh filtration membrane placed on the support 2, the reduced pressure (vacuum) may generate a vortex in the remaining sample liquid that may lead to the creation of droplets as described above. However, the provision of the protective shield 6 acts as a screen or barrier for preventing that droplets on a direct path may hit the downstream or lower surface side of the membrane and contaminate the (next) sample to be tested (see FIGS. 5b and 5c).

The provision of the protective shield 6 inside the void space of the filtration head, in particular in the drain chamber 4, also acts as a solution for adjusting the level of wetting of the filtration membrane. The empty volume available inside the filtration head corresponds in part to the volume of the residual vacuum present after filtration and before the filtration membrane is removed from its support. The other part corresponds to the liquid. After filtration, when the reservoir or funnel is empty, the membrane is not anymore permeable to air due to its small pore size. Therefore, after filtration of all the liquid from the funnel, the reduced pressure is maintained under the filtration membrane even if the vacuum valve further downstream of the filtration head or in the filtration head is closed. When the membrane is removed or detached from its support in this situation, the remaining residual vacuum sucks a part of the remaining liquid located in the drain channel to a place below the membrane (dry out phenomenon). The dry out capacity is directly related to the empty volume available in the filtration head. The larger this volume is, the more the membrane will be dried. Consequently, the partial or substantial occupation of the inner space of the drain chamber 4 downstream of the filtration membrane 3 by the body of the shield 6 reduces the void volume and mitigates the effect of membrane drying.

A further effect of the protective shield is a solution to make it possible to add a specific buffer liquid for treatment into the filtration head for a certain period of time (several minutes) after the filtration. After filtration, when the reservoir or funnel is empty, the membrane as described above is not any more permeable to air due to its small pore size, with the further consequence that a reduced pressure is maintained below the filtration membrane.

To apply the buffer liquid, the liquid is poured into the reservoir or funnel of the filtration head upstream of the filtration membrane while the vacuum valve downstream of the filtration head is maintained closed. The buffer liquid must, however, remain on the membrane for several minutes. In this time the remaining reduced pressure downstream of the filtration membrane sucks a portion of the buffer liquid through the membrane. As a compensation of this loss a larger amount of buffer liquid could be added upstream of the filtration membrane to ensure that the correct volume is maintained on the upper or top surface side of the membrane and to compensate the part of the liquid sucked through the filtration membrane. The reduction of the void volume of drain chamber 4 downstream of the filtration membrane 3 in consequence of the arrangement of the body of the protective shield 6 reduces the size of the empty space and consequently the consumption of buffer liquid in this situation.

The invention is described above in connection with a single filtration head. It also pertains to a manifold for vacuum filtration which has typically a plurality of filtration heads of the invention arranged adjacent to each other on and along a common collection channel communicating with the respective drain channels of the individual filtration heads. As compared to prior art systems the filtration heads provided with the protective shield of the invention can be formed smaller, thereby reducing the material and footprint required for such manifold structure.

The invention also pertains to a method of modifying, by retrofitting, an existing filtration head for vacuum filtration which is not initially provided with the protective shield inside the filtration head and accordingly suffers from the deficiencies outlined above. In line with the foregoing description the invention concerns a method which includes arranging, preferably removably, a body of a protective shield 6 in the existing filtration head so as the block/interfere with a fictive direct straight line connection between the opening 9 of the drain channel 5 into the drain chamber 4 and the membrane filter 3 while retaining a fluid path 7 to the drain channel 5 past/around the body of the protective shield 6.

As described above the protective shield in the context of the method may be permanently fixed in place or may be removably inserted to the filtration head in the form of an insert. The body of the protective shield may be formed and dimensioned so as to fit into the inner space of the drain chamber 4 and/or of the drain channel 5 of a particular type of the existing filtration head similar to the embodiments of filtration heads described above.

The body of the shield 6 and the spacer or spacers for positioning the body in the proper posture within the inner space of the drain chamber 4 and/or of the drain channel 5 can be integrally formed in one piece from one or several elements or can be formed as separate elements that remain separable from each other and are, for example, held in place relative to each other in a form-locking arrangement.

If required, the drain chamber and/or the drain channel can be widened, for example by a drilling, in order to create a required accommodation space for a particular protective shield body. The method has the advantage that existing designs of filtration heads can be substantially retained but optimized in a cost-effective way without substantially changing the structure.

The invention claimed is:

1. A filtration head (1) for vacuum filtration, the filtration head (1) comprising:
   a receptacle for a support (2) for a membrane filter (3) for microbiological testing of a liquid substance to be drawn from an upstream side of the membrane filter (3) to a downstream side of the membrane filter (3) through the membrane filter (3), or the support (2) for such membrane filter (3);

a drain chamber (4) located downstream of the support (2) and communicating with a downstream side of the membrane filter (3) when the membrane filter (3) is in place on the support (2) to receive the liquid substance that has passed through the membrane filter (3);

a drain channel (5) communicating with the drain chamber (4) at an opening (9) and intended to communicate, in use, with downstream equipment including a vacuum pump to drain the liquid substance; and a shield (6) arranged in the filtration head (1) so as to block/interfere with a fictive direct line connection between the opening (9) of the drain channel (5) into the drain chamber (4) and the membrane filter (3), while permanently retaining a fluid path (7) to the drain channel (5) past the shield (6).

2. The filtration head (1) according to claim 1, wherein the shield (6) is permanently fixed in place in the filtration head (1).

3. The filtration head (1) according to claim 2, wherein the shield (6) is arranged in an inner space of the drain chamber (4).

4. The filtration head (1) according to claim 3, wherein the shield (6) is a body (6a) occupying a part of the inner space of the drain chamber (4) to reduce a void volume thereof while retaining the fluid path (7) to the drain channel (5), and wherein the fluid path (7) is formed between an inner circumference/periphery of the drain chamber (4) and an outer circumference/periphery of the body (6a).

5. The filtration head (1) according to claim 3, wherein the shield (6) is a body (6a) occupying a part of the inner space of the drain chamber (4) to reduce a void volume thereof while retaining the fluid path (7) to the drain channel (5).

6. The filtration head (1) according to claim 5, wherein the shield (6) is a solid or hollow body (6a) with one or more spacers provided at an outer periphery of the solid or hollow body (6a) so as to retain the body (6a) in place in the inner space of the drain chamber (4) while retaining the fluid path (7) to the drain channel (5).

7. The filtration head (1) according to claim 1, wherein the shield (6) is an insert removable from the filtration head (1).

8. The filtration head (1) according to claim 7, wherein the shield (6) is removably disposed in an inner space of the drain chamber (4).

9. The filtration head (1) according to claim 8, wherein the shield (6) is a body (6a) occupying a part of the inner space of the drain chamber (4) to reduce a void volume thereof while retaining the fluid path (7) to the drain channel (5), and wherein the fluid path (7) is formed between an inner circumference/periphery of the drain chamber (4) and an outer circumference/periphery of the body (6a).

10. The filtration head (1) according to claim 1, wherein the shield (6) comprises a body and an expanded head portion wherein the expanded head portion is positioned adjacent the downstream side of the membrane filter (3).

11. The filtration head (1) according to claim 1, where the fluid path (7) to the drain channel (5) spans around all sides of the shield (6).

12. The filtration head (1) according to claim 1, where the fluid path (7) to the drain channel (5) spans around an outer circumference/periphery of the shield (6).

13. A manifold for vacuum filtration, the manifold comprising: a plurality of filtration heads (1) according to claim 1 arranged on a common collection channel communicating with the respective drain channels (5) of the filtration heads (1).

14. A filtration head (1) for vacuum filtration, the filtration head (1) comprising:

a receptacle for a support (2) for a membrane filter (3) for microbiological testing of a liquid substance to be drawn from an upstream side of the membrane filter (3) to a downstream side of the membrane filter (3) through the membrane filter (3), or the support (2) for such membrane filter (3);

a drain chamber (4) located downstream of the support (2) and communicating with a downstream side of the membrane filter (3) when the membrane filter (3) is in place on the support (2) to receive the liquid substance that has passed through the membrane filter (3);

a drain channel (5) communicating with the drain chamber (4) at an opening (9) and having an outlet intended to communicate, in use, with downstream equipment including a vacuum pump to drain the liquid substance; and a shield (6) comprising a body and an expanded head portion which is arranged in the drain channel (5) of the filtration head (1) so as to block/interfere a fluid path between the opening (9) of the drain channel (5) and the outlet of the drain channel (5), while permanently retaining a fluid path (7) through the drain channel (5) past the shield (6), wherein the expanded head portion is positioned adjacent the opening (9) of the drain channel (5).

15. The filtration head (1) according to claim 14, where the fluid path (7) to the drain channel (5) spans around all sides of the shield (6).

16. The filtration head (1) according to claim 14, where the fluid path (7) to the drain channel (5) spans around an outer circumference/periphery of the shield (6).

17. The filtration head (1) according to claim 14, wherein the shield (6) is permanently fixed in place in the filtration head (1).

18. The filtration head (1) according to claim 17, wherein the shield (6) is arranged in an inner space of the drain chamber (4).

19. The filtration head (1) according to claim 18, wherein the shield (6) is a body (6a) occupying a part of the inner space of the drain chamber (4) to reduce a void volume thereof while retaining the fluid path (7) to the drain channel (5).

20. The filtration head (1) according to claim 14, wherein the shield (6) is an insert removable from the filtration head (1).

21. The filtration head (1) according to claim 20, wherein the shield (6) is removably disposed in an inner space of the drain chamber (4).

* * * * *